United States Patent
Tsujimoto et al.

(10) Patent No.: US 6,420,671 B1
(45) Date of Patent: Jul. 16, 2002

(54) WELDING APPARATUS

(75) Inventors: Yoshikazu Tsujimoto; Tsuyoshi Inada, both of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/827,527

(22) Filed: Apr. 5, 2001

(51) Int. Cl.⁷ .............................. B23K 9/28; B23K 11/11
(52) U.S. Cl. ..................... 219/79; 219/80; 219/86.24; 219/86.25
(58) Field of Search ................ 219/79, 80, 86.24, 219/86.25, 86.33, 86.41, 86.51, 86.61, 86.7, 86.8, 91.2

(56) References Cited

U.S. PATENT DOCUMENTS

| | | | |
|---|---|---|---|
| 3,575,569 A | * | 4/1971 | Mitchell et al. |
| 3,681,561 A | * | 8/1972 | Okano |
| 4,316,072 A | * | 2/1982 | Arnoldt |
| 4,754,116 A | * | 6/1988 | Naruse et al. |
| 4,766,282 A | * | 8/1988 | Riordan et al. |
| 4,786,779 A | * | 11/1988 | Fushimi et al. |
| 5,010,228 A | * | 4/1991 | Nishiwaki |
| 5,185,508 A | * | 2/1993 | Perkinson, III |
| 5,424,505 A | * | 6/1995 | Kiyota |
| 5,548,096 A | * | 8/1996 | Akasaka et al. |
| 5,801,353 A | * | 9/1998 | Pirila |
| 5,943,768 A | * | 8/1999 | Ray |
| 6,271,496 B1 | * | 8/2001 | Domschot |
| 6,293,454 B1 | * | 9/2001 | Zhang et al. |
| 6,303,893 B1 | * | 10/2001 | Perks |

FOREIGN PATENT DOCUMENTS

| | | | |
|---|---|---|---|
| JP | 359206178 A | * | 11/1984 |
| JP | 363142086 A | * | 6/1987 |
| JP | 401170584 A | * | 7/1989 |

* cited by examiner

*Primary Examiner*—Tom Dunn
*Assistant Examiner*—Kiley Stoner
(74) *Attorney, Agent, or Firm*—Jordan and Hamburg LLP

(57) ABSTRACT

The present invention can weld two parts of component metal fitting constituting the parts as a welding apparatus used in manufacturing automotive parts such as a strut mount upon positioning and laminating. Furthermore, a welded part can be easily recovered to improve the operationality of welding. This welding apparatus has support tables to support two parts of component metal fitting. The support table has thereon a positioning pin provided standing in a position corresponding to the penetration holes possessed in the both parts of component metal fitting and a lower electrode to support the two parts of component metal fitting in their joining points. In a position further above thereof, an upper electrode is provided that is held vertically movable. The positioning pin in its upper end is made in a tapered form. The pin is supported elastically pressed down by spring means. Furthermore, urging means is provided to press down the pin against the spring means separately from the upper electrode. Due to pressing down of this urging means, the pin is pressed down from a state that the tapered upper end is positioned above the penetration hole of the parts of component metal fitting supported by the lower electrode. The pin and the penetration hole at its peripheral edge are to be disengaged.

3 Claims, 6 Drawing Sheets

WELDING APPARATUS

BACKGROUND OF THE INVENTION

1. Field of the Invention

The present invention relates to a welding apparatus used in manufacturing automotive parts, such as strut mounts mainly used in vehicular front supports.

2. Related Art

There are strut mounts as automotive parts for front support employed on the front side of a vehicle. The strut mount is used in a strut-type suspension to couple the upper end of a piston rod of a shock absorber to a vehicular panel through an insulator rubber.

The strut mount 1 is structured, as shown in FIG. 8 and FIG. 9, by joining main-body metal fitting 2 as a case accommodating the insulator rubber (not shown) by press-fit means and cover metal fitting 3 serving also as a mount bracket through their flanges 2a, 3a. The flanges 2a, 3a are fixed to the vehicular panel through bolts and nuts. For this reason, the flanges 2a, 3a of the main-body metal fitting 2 and cover metal fitting 3 have a plurality of penetration-holes 5 formed at a required interval in a circumferential direction in order to mount to the vehicular panel.

In the manufacture of the strut mount 1, the main-body metal fitting 2 and cover metal fitting 3 accommodating the insulator rubber are joined together at their flanges 2a, 3a by the welding means, with the flanges 2a, 3a contacted with each other.

In the welding between the main-body metal fitting 2 and the cover metal fitting 3, so-called the resistance welding technique is adopted. In the welding, usually two metal plates are laminated to vertically apply pressure to a weld point by use of an electrode and great current is supplied for direct energizing so that the joining point between the metal plates can be heated up by occurrence of Joule's heat. Simultaneously, great pressure is applied to the metal plates to weld them at their contact sides.

The related art weld process has used a welding apparatus having a lower electrode arranged on a support table to support a main-body metal fitting and cover metal fitting to be welded and an upper electrode arranged for vertical movement above that electrode. The support table has a plurality of positioning pins projecting therefrom that are to be fitted in the mounting penetration-holes of the flanges of the main-body metal fitting and cover metal fitting. In welding operation, main-body metal fitting and cover metal fitting are supplied one by one onto the support table. The penetration-holes are fit with the pin. to hold them with positioning in a lamination state. By descending the upper electrode, welding is made while clamping predetermined weld. points by the upper and lower electrodes. This operation is repeated to proceed welding.

In the meanwhile, the positioning pins and the penetration-holes of the main-body metal fitting and cover metal fitting to be fit therewith are formed with comparative accuracy in order to provide improved positioning accuracy and preferred quality of welding. Accordingly, when welding is once made by fitting the penetration-holes of the main-body metal fitting and cover metal fitting with the pins, the penetration holes at their peripheral edges are in engagement with the pins under the influence of welding heat or the like. This however makes it uneasy to manually remove them from the pins, resulting in impairing the operationality in welding.

It is an object of the present invention to provide a welding apparatus capable of welding two parts of component metal fitting to be joined in a state held in position and easily remove a welded part from a positioning pin through a simple structure as a welding apparatus used for welding two of metal fitting, such as main-body metal fitting and cover metal fitting in the manufacture of automotive parts, such as strut mounts, thereby improving operationality in welding.

SUMMARY OF THE INVENTION

A welding apparatus for achieving the above object is in a welding apparatus for positioning and welding two parts of component metal fitting formed with a plurality of penetration holes spaced in circumferential direction in manufacturing automotive parts, the welding apparatus having support tables to support two parts of component metal fitting to be welded, positioning pins provided standing on the support table in positions corresponding to a plurality of penetration holes possessed in the two part of component metal fitting and to be fit with the penetration holes, a lower electrode provided to support the two parts of component metal fitting at joining portions thereof, and an upper electrode vertically movably provided in an upper position corresponding to the lower electrode, the positioning pin having an upper end formed in a tapered form, the pin being supported to be elastically pressed down by spring means, the tapered upper end being to be pressed down from a projection state in a position above the penetration hole of the part of component metal fitting held by the lower electrode, and urging means provided to press down the pin against the spring means separately from the upper electrode.

According to this welding apparatus, where welding two parts of component metal fitting formed with a plurality of penetration holes at an interval in the circumferential direction by use of this welding apparatus in manufacturing automotive parts such as strut mounts, the both parts of component metal fitting are supplied one by one to the support tables and the penetration holes possessed in them are fitted with the positioning pins possessed on the support tables to provide positioning and rested and stacked on the lower electrode possessed on the support tables.

At this time, the positioning pin is in a projecting state that the tapered upper end is above the penetration hole of the part component metal fitting supported by the lower electrode by spring means. The both parts of component metal fitting is accurately positioned and laminated by fitting the penetration hole with a lower portion of the tapered upper end of the positioning pin.

In this state, the upper electrode is descended to vertically clamp a predetermined joining point by the upper and lower electrodes. The both electrodes are energized to weld opposed surfaces of the laminated both parts of component metal fitting. When an automotive part completed of welding is recovered from the support table, urging means separate from the upper electrode is descended to press down the positioning pin against the spring means.

By this pressing down, the tapered upper end of the pin is pressed down to a position of the penetration hole of the part of component metal fitting or the below. As a result, even if the penetration hole at its peripheral edge and the pin are formed comparatively accurate and in an engagement state due to the influence of welding heat, the engagement is to be released. Accordingly, it is possible to easily take up and recover the automotive part completed of welding from the support table.

In the welding apparatus, a turntable is provided that intermittently rotates by a required angle per time, the support tables being mounted at a required interval in a circumferential direction on the turntable, the vertically movable upper electrode provided above one stop positions of the support table due to rotation halt of the turntable, the urging means for pressing down the positioning pin provided above one stop position of another one of the support table, the upper electrode descending to carry out welding and the urging means descending at a halt of rotation thereof correspondingly to the intermittent rotation of the turntable.

Due to this, two parts constituting welding automobile parts are supplied one by one to a plurality of support tables on the intermittently rotating turntable on the basis of each support table in a predetermined stop position and positioned by fitting respective penetration holes with the positioning pins, supported by the lower electrode. The upper electrode descends from the above in a stop position of one support table at a halt of rotation correspondingly to the intermittent rotation of the turntable to cooperate with the lower electrode on the support table, clamping and welding the two welding parts of component metal fitting. In a stop position of another support table, the urging means descends to press down the positioning pin against spring means thereby making possible to disengage the pin from the part of component metal fitting. Accordingly, welding operation for strut mount metal fitting can be successively made. Automation is easy and the operation efficiency of welding can be improved. Also, even for those to be successively welded, the welding apparatus is not excessively increased in size, thus suppressing increase of installation space.

Furthermore, the turntable is provided intermittently rotatable by 90 degrees per time, the support tables being mounted at a positional interval of 90 degrees in the circumferential direction on the turntable, the upper electrode being provided above one stop position of the support table, the urging means being provided above a stop position opposite thereto. In this case, the efficiency of welding operation and space saving are made further effective.

DETAILED DESCRIPTION OF THE PREFERRED EMBODIMENT

With reference to the drawings, an embodiment of a welding apparatus of the present invention will now be explained by exemplifying a strut mount as an automotive part to be welded.

Figure 8:
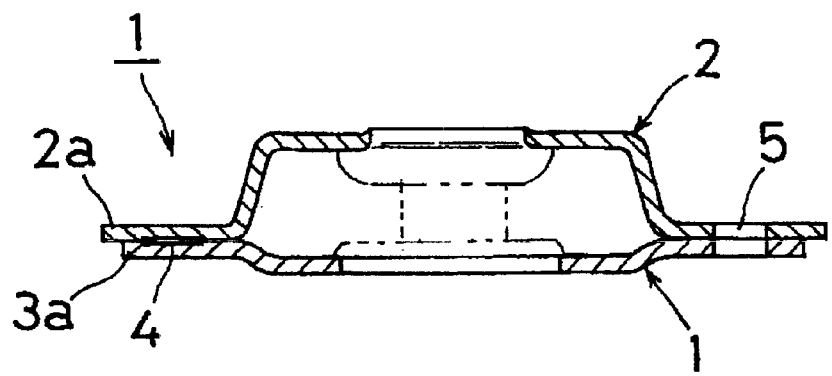
FIG. 8 is a sectional view showing a strut mount to be welded by omitting an interior structure.
Figure 9:
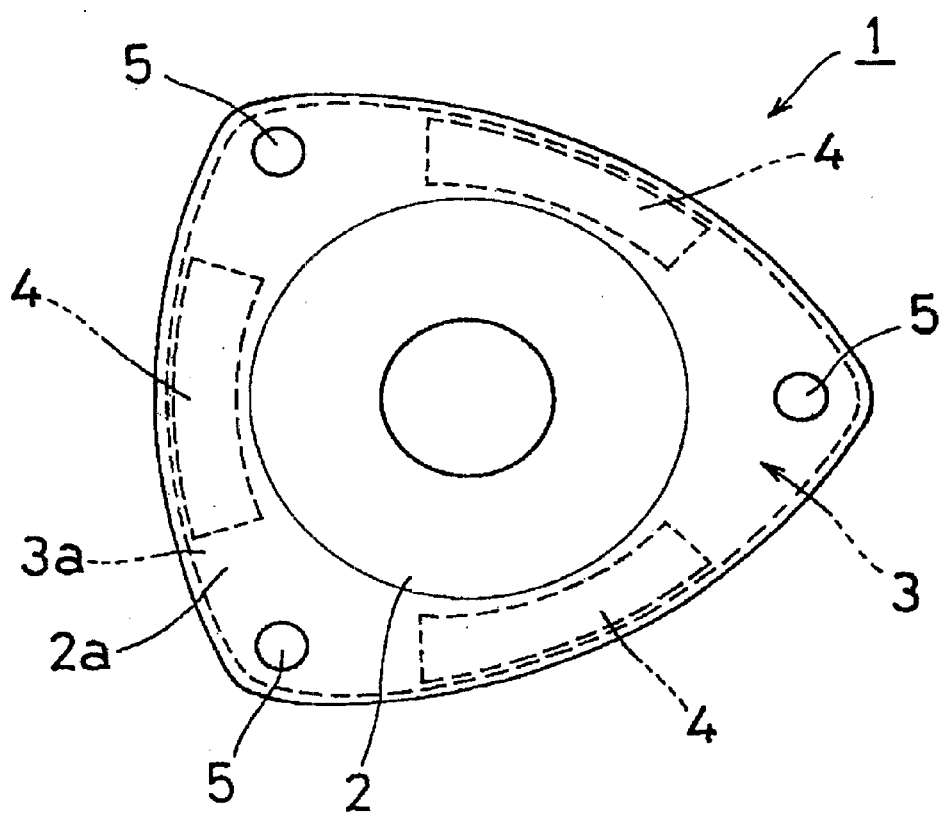
FIG. 9 is a generally shown plan view of the same strut mount.

A strut mount 1 to be welded by an apparatus of this embodiment is as shown in FIG. 8 and FIG. 9, wherein main-body metal fitting 2 accommodating an insulator rubber (not shown) and cover metal fitting 3 serving also as a mount bracket are welded at their flanges 2a, 3a, in a plurality of points at an interval mainly in a circumferential direction thereof. 4 represents a welding portion. In the metal fitting flanges 2a, 3a, a plurality of penetration-holes 5 for mount to a vehicular panel are formed at a circumferential interval in positions other than the welding portion 4.

In FIG. 1 to FIG. 7, the welding apparatus 10 of the embodiment has a turntable 11 intermittently rotating by, for example, 90 degrees per time and a motor 12 for rotatively driving this by a predetermined angle per time. The turntable 11 has thereon a plurality of support tables 13 provided at a predetermined interval in the circumferential direction, e.g. in a plurality (e.g. four) of equiangular positions corresponding to the foregoing rotational angle, to support the main-body metal fitting 2 and cover metal fitting 3 as two-part components of metal fitting to be welded.

The support table 13 has a mounting-base member 14 thereon. The base member 14 has positioning pins 20 provided standing thereon at a plurality of positions (three positions in the figure) that are respectively to fit with the penetration-holes 5 possessed by the main-body metal fitting 2 and cover metal fitting 3. A lower electrode 15 is arranged projecting upward in a position corresponding to the welding portion 4 in the joining portions of the both of metal fitting. That is, the main-body metal fitting 2 and the cover metal fitting 3 can be held by the lower electrode 15 in a state they are positioned by fitting the penetration-holes 5 with the positioning pins 20.

The positioning pin 20 has an upper end 23 in a tapered form and a lower portion than the upper end 23 formed to be accurately fit and positioned with the penetration hole 5.

Figure 1:
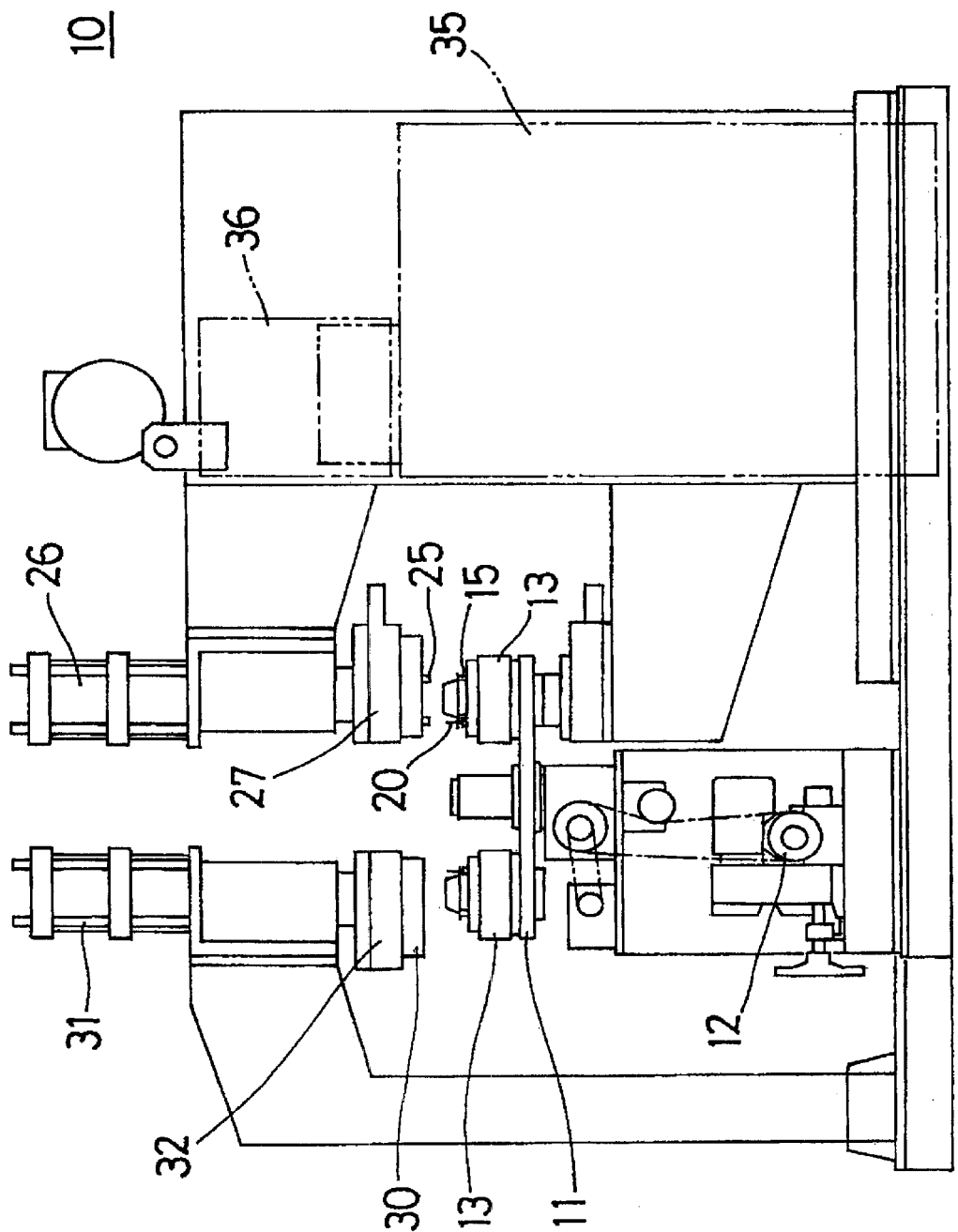
FIG. 1 is a front view of a welding apparatus of one embodiment of the present invention.
Figure 2:
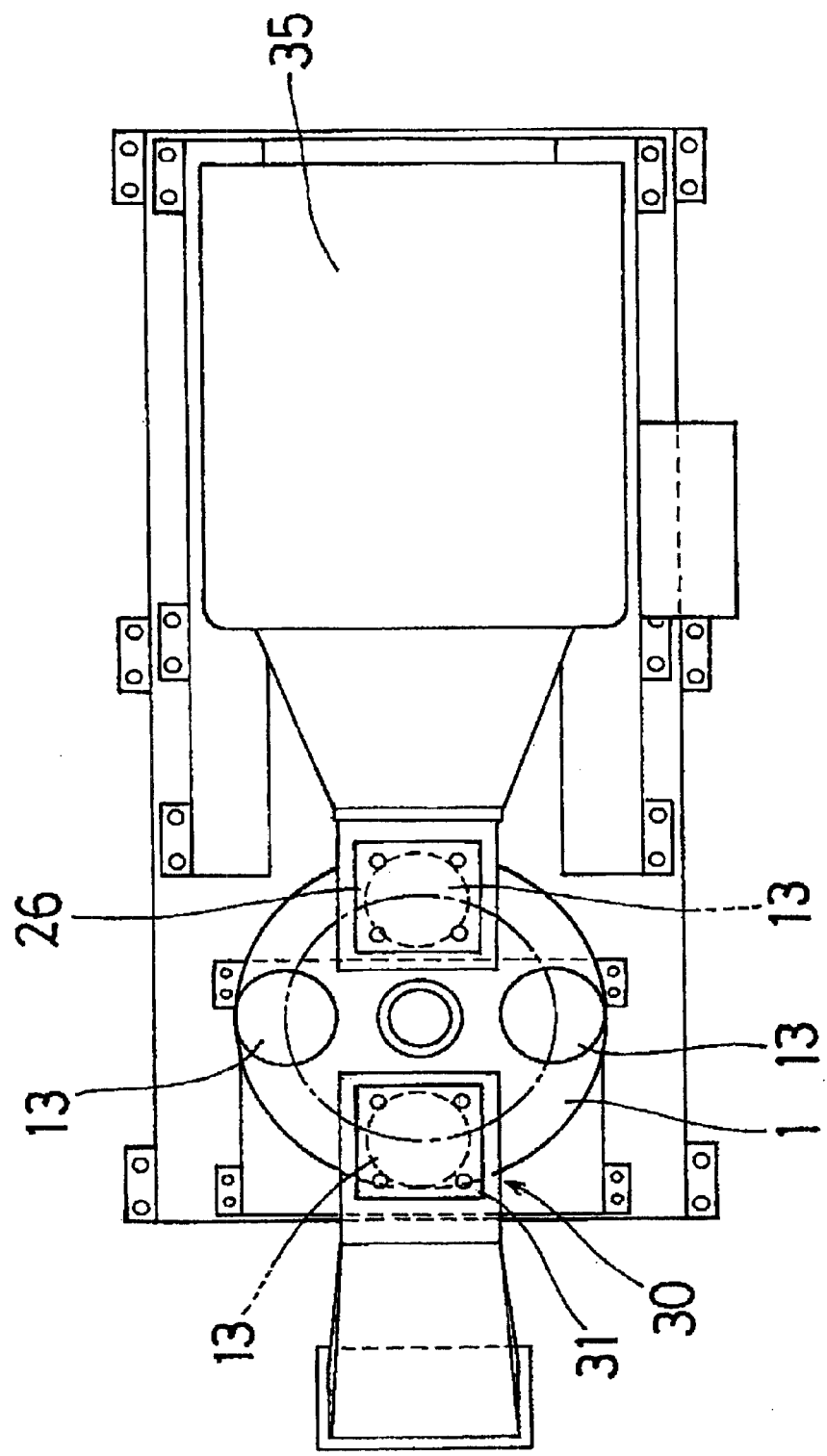
FIG. 2 is a plan view of the same welding apparatus.
Figure 3:
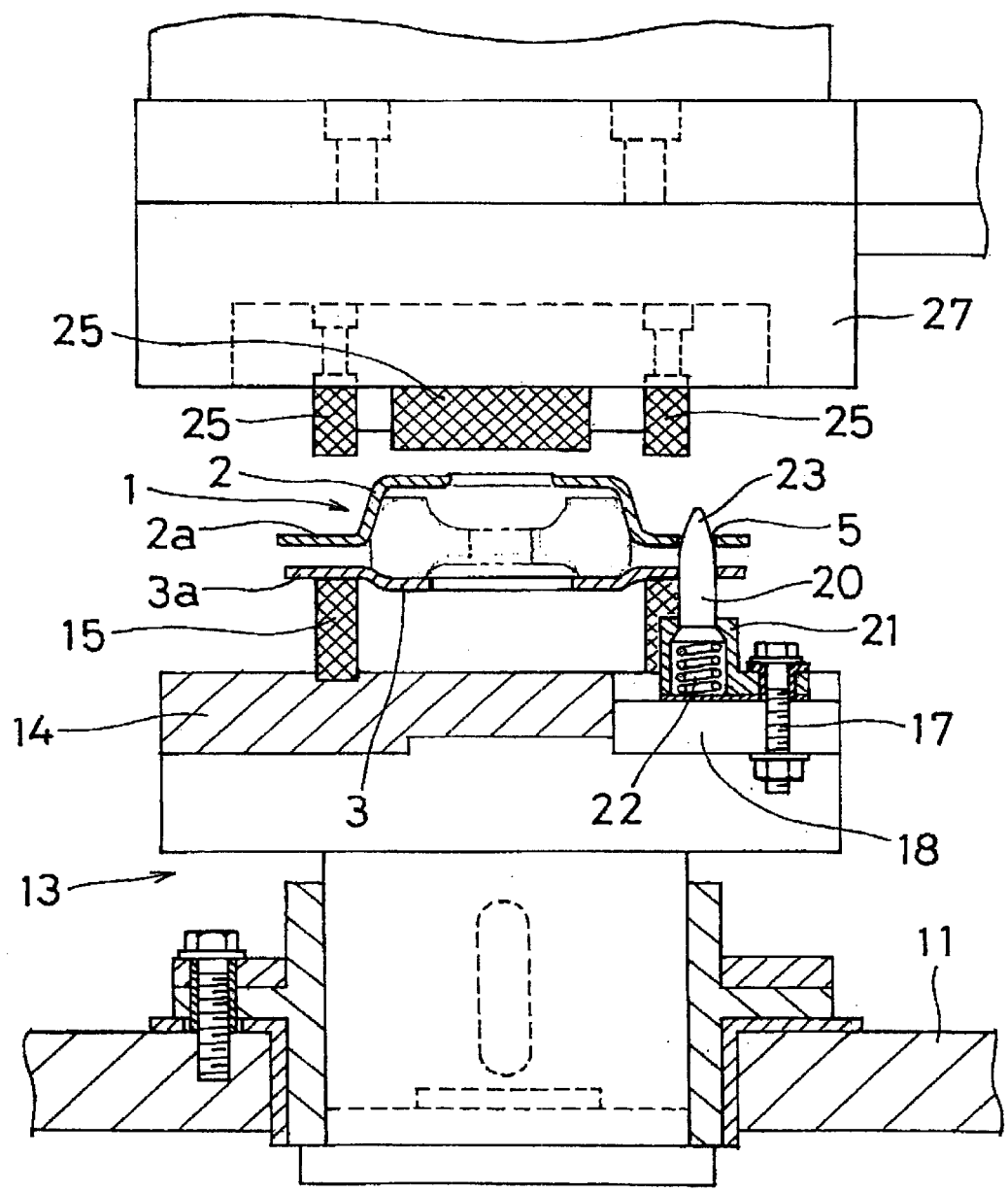
FIG. 3 is a magnifying sectional view of a part of a welding process part of the same welding apparatus.
Figure 4:
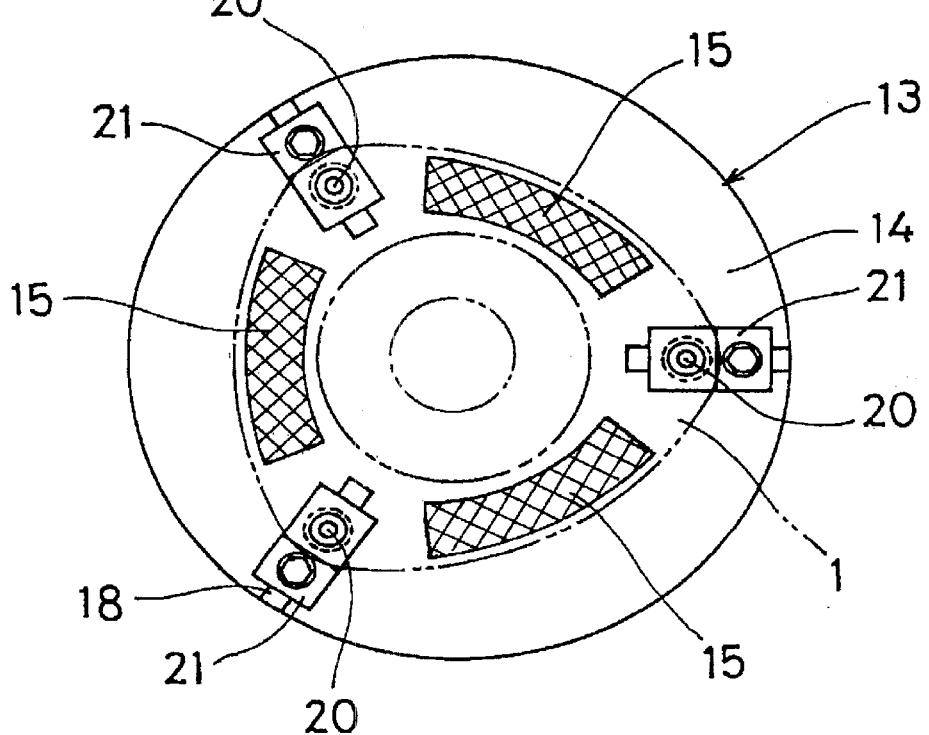
FIG. 4 is a plan view of a support table.
Figure 5:
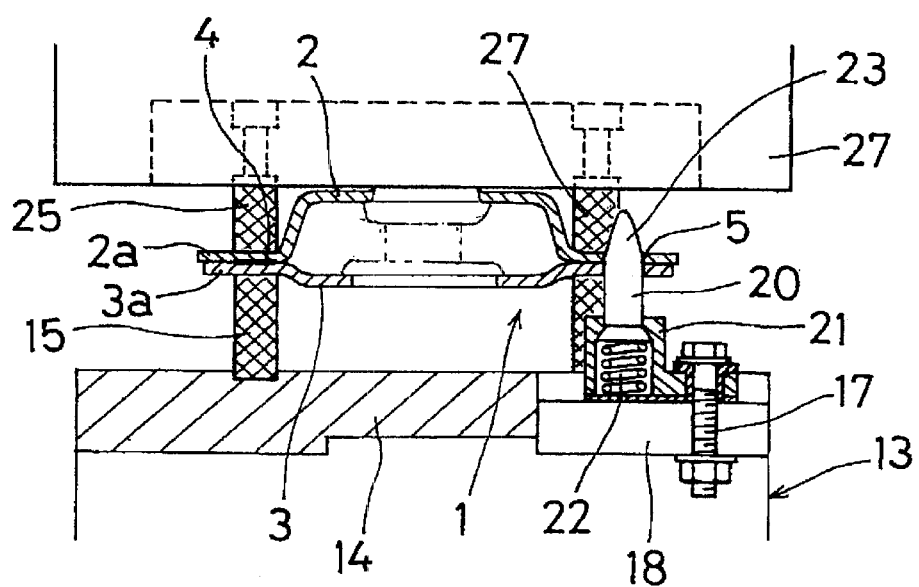
FIG. 5 is a sectional view of an essential part in welding of the same process part.
Figure 6:
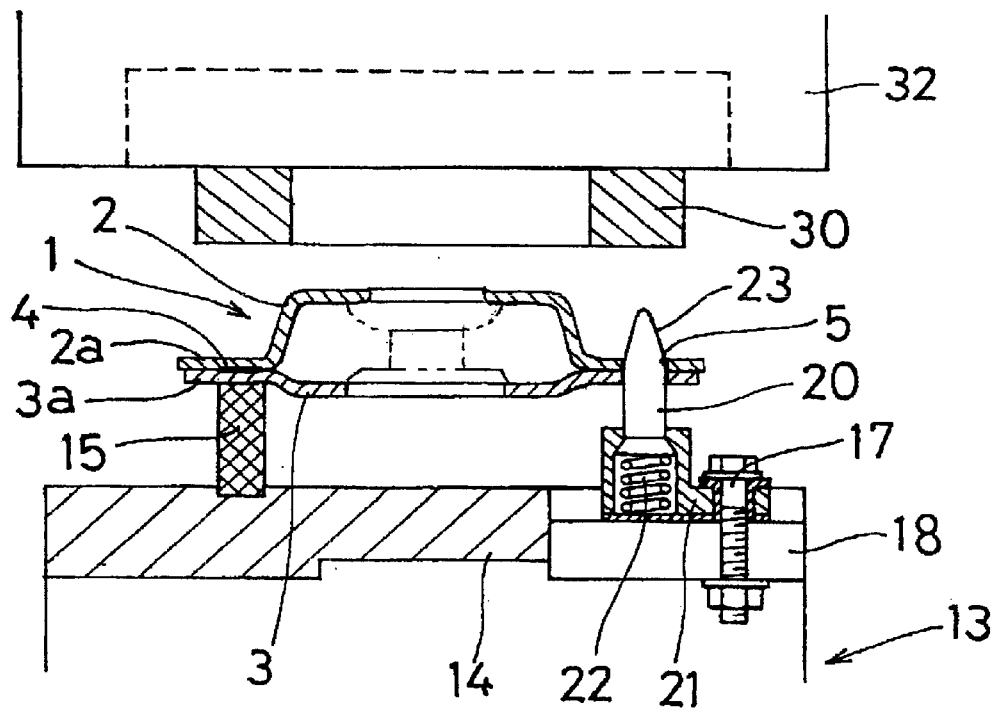
FIG. 6 is a magnifying sectional view of a press down process part of a positioning pin.
Figure 7:
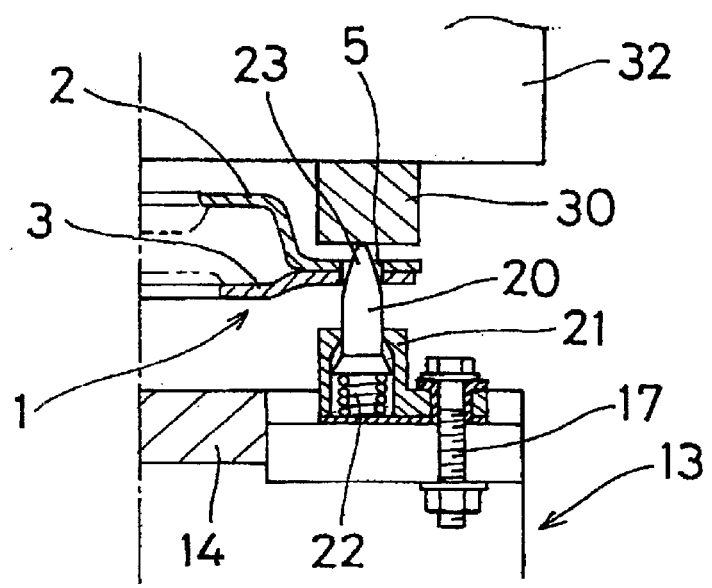
FIG. 7 is a sectional view of a part in a pressing down state of the same process part.

This positioning pin 20 is received in a support hole possessed in a support member 21 fixed on the base member 14 and while being upward by spring means 22 provided inside the support member 21 as shown in FIG. 6 and FIG. 7, which is provided elastically pushed down against a biasing force of the spring means 22. In particular, this positioning pin 20 is normally constructed in a state that the tapered upper end 23 protrudes to an above position from the penetration hole 5 of the main-body metal fitting 2 and cover metal fitting 3 held by the lower electrode 15. When pressed down against the spring means 22, the upper end 23 positions in the penetration hole 5 or below that.

Also, the support member 21 is fixed by fixing means 17 due to a bolt inserted through a radial slit 18 possessed in the base member 14 and radially adjustable in fixing position along the slit 18.

In the above of one stop position of the support table 13 due to halt of rotation of the turntable 11, an upper electrode 25 is provided vertically movable in a position corresponding to the lower electrode 15 on the support table 13. The upper electrode 25 is attached on a support member 27 driven for elevation by a drive source 26, such as a hydraulic cylinder. At rotation halt of the turntable 11, the upper electrode 25 descends to cooperate with the lower electrode 15 to clamp down and weld the main-body metal fitting 2 and cover metal fitting 3 to be welded.

The lower electrode 15 and the upper electrode 25 have opposite surfaces corresponding to a range of the welding portion between the main-body metal fitting 2 and the cover metal fitting 3 for the strut mount 1 to be welded and arranged corresponding to the welding portion 4, e.g. non-continuous annular arrangement. Also, energizing means to the lower electrode 15 and upper electrode 25 and cooling means therefor can employ substantially the similar structures to those of the conventional existing welding apparatus with a resistance welding technique, and hence the structures thereof will be omittedly shown.

Furthermore, in another stop position of the support table 13 due to rotation halt of the turntable 11, i.e. in the above of a stop position opposed to the upper electrode 25, urging means 30 is provided to press down the positioning pin 20 on the support table 13 against the spring means 22. This urging means 30 is attached on a support member 32 to be driven for elevation by a drive source 31, such as a hydraulic cylinder, and urges the pin 20 due to descending upon rotation halt of the turntable 11. Thus, the pin 20 can be pressed down to a point that the tapered upper end 23 comes to a position in the penetration hole 5 or the below position.

Incidentally, in the illustrated embodiment, of the stop positions of the support table 13 due to rotation halt of the turntable 11, the stop position of between a position having the upper electrode 25 and a position having the urging means 30 serves also as a position to supply main-body metal fitting 2 and cover metal fitting 3 to the support table 13 and a position to recover a welded part. 35 in the figure is a control device having display means 36.

Explanation will be made on the operation in the case that the main-body metal fitting 2 and the cover metal fitting 3 are welded in manufacturing a strut mount 1 as an automotive part by the welding apparatus 10 of the embodiment.

Main-body metal fitting 2 and cover metal fitting 3 to be welded are supplied onto a plurality of support tables 13 over the turntable 11 that rotates intermittently. That is, main-body metal fitting 2 and cover metal fitting 3 are supplied one by one onto the support table 13 in a predetermined stop position manually by an operator or automatically by robotic handling operation, in a manner matched to rotation and stoppage of the turntable 11. Each is positioned by fitting the penetration holes 5 with the positioning pins 20 possessed by the support table 13 and rested and laminated on the lower electrode 15 possessed by the support table 13.

At this time, the positioning pin 20 is projecting above at its tapered upper end 23 from the penetration hole 4 of the main-body metal fitting 2 and cover metal fitting 3 received on the lower electrode 15, due to a biasing force of the spring means 22. Accordingly, the penetration hole 5 is fit over the pin 20 at its lower portion of the upper end 23 to provide accurate positioning and lamination.

In this manner, when the turntable 11 rotates by a predetermined angle (about 90 degrees) and comes to halt at the next position, the upper electrode 25 positioned above descends due to the actuation by the drive source 26 and cooperates with the lower electrode 15 on the support table 13 to vertically clamp a point corresponding to a welding point 4 of the main-body metal fitting 2 and cover metal fitting 3 to be welded. In this state, pressure is applied while supplying a great current through the upper and lower electrodes 15, 25, to heat up and weld the welding point between the main-body metal fitting 2 and cover metal fitting 3. This accurately laminates and welds the main-body metal fitting 2 and cover metal fitting 3.

Completing welding for one strut mount 1, the upper electrode 25 is ascended and the turntable 11 is again rotated. When the support table 13 moves to a stop position having the urging means 30, the urging means 30 is descended by the actuation of the drive source 31 to press down the positioning pin 20 against the spring means 22. This pressing down presses the tapered upper end 23 of the pin 20 to the position of the penetration hole 5 or the below as shown in FIG. 7. As a result, the penetration hole 5 at its peripheral edge and the pin .20 goes into disengagement. That is, even where the peripheral edge of the penetration hole 5 and the pin 20 are engaged due to the influence of welding heat, the engagement is released by forcibly pressing down the pin 20. Accordingly, the strut mount 1 completed of welding can be easily recovered from the support table 13 in the next stop position of rotation of the turntable 11. In this manner, it is possible to successively carry out the operations of supply of the both metal fittings, positioning, welding, pressing down of the positioning pin and the like for the both of metal fitting on each support table 13 rested on the turntable 11. Thus, welding operation is improved in operation efficiency.

Incidentally, the welding apparatus of the invention is not limited to the use for welding between the main-body metal fitting and the cover metal fitting in the manufacture of a strut mount 1. It can be similarly implemented also in a welding apparatus to weld two part of component metal fitting in the manufacture of other automotive parts, exhibiting a similar effect.

What is claimed is:

1. In a welding apparatus for positioning and welding two parts of component metal fitting formed with a plurality of penetration holes spaced in circumferential direction in manufacturing automotive parts, the welding apparatus having support tables to support two parts of component metal fitting to be welded, positioning pins provided standing on the support table in positions corresponding to a plurality of penetration holes possessed in the two parts of component metal fitting and to be fit with the penetration holes, a lower electrode provided to hold the two parts of component metal fitting at joining portions thereof, and an upper electrode vertically movably provided in a position above the lower electrode, the positioning pin having an upper end formed in a tapered form, the pin being supported to be elastically pressed down by spring means, the tapered upper end being to be pressed down from a projection state in a position above the penetration hole of the part of component metal fitting held by the lower electrode, and urging means provided to press down the pin against the spring means separately from the upper electrode.

2. A welding apparatus according to claim 1, comprising a turntable intermittently rotating by a required angle per time, the support tables being mounted at a required interval in a circumferential direction on the turntable, the vertically movable upper electrode provided above one stop positions of the support table due to rotation halt of the turntable, the urging means for pressing down the positioning pin provided above one stop position of another one of the support table, the upper electrode descending to carry out welding and the urging means descending at a halt of rotation thereof correspondingly to the intermittent rotation of the turntable.

3. A welding apparatus according to claim 2, wherein the turntable is provided intermittently rotatable by 90 degrees per time, the support tables being mounted at a positional interval of 90 degrees in the circumferential direction on the turntable, the upper electrode being provided above one stop position of the support table, the urging means being provided above a stop position opposite thereto.

* * * * *